United States Patent [19]

Sochol et al.

[11] 4,000,249

[45] Dec. 28, 1976

[54] PREPARATION OF ALKALI METAL CYANATES

[75] Inventors: Irving Sochol, Baltimore; Jay Y. Welsh, Catonsville, both of Md.

[73] Assignee: Diamond Shamrock Corporation, Cleveland, Ohio

[22] Filed: Jan. 15, 1976

[21] Appl. No.: 649,213

[52] U.S. Cl. ............................................. 423/365
[51] Int. Cl.² .......................................... C01C 3/14
[58] Field of Search ........................... 423/364, 365

[56] References Cited

UNITED STATES PATENTS

| | | | |
|---|---|---|---|
| 1,915,425 | 6/1933 | Kloepfer et al. | 423/365 |
| 2,690,957 | 10/1954 | Horst | 423/365 |
| 2,801,154 | 7/1957 | De Pree | 423/365 |
| 3,188,171 | 6/1965 | Ghyssaert | 423/365 |
| 3,197,275 | 7/1965 | Iwai | 423/365 |

*Primary Examiner*—Earl C. Thomas
*Attorney, Agent, or Firm*—William A. Skinner

[57] ABSTRACT

Process for the preparation of alkali metal cyanate by the reaction of urea and alkali metal carbonate. The addition of water to the reaction in an intermediate step activates partially blocked alkali metal carbonate and provides an alkali metal cyanate product of high purity.

9 Claims, No Drawings

PREPARATION OF ALKALI METAL CYANATES

FIELD OF THE INVENTION

This invention relates generally to a process for the preparation of alkali metal cyanate by the direct reaction of urea and alkali metal carbonate. More particularly the present invention concerns an improved process for the reaction of urea and alkali metal carbonate wherein water is added to the reaction in an intermediate step to activate partially blocked carbonate.

BACKGROUND OF THE INVENTION

Alkali metal cyanates were initially produced by oxidation of the corresponding cyanide compounds. However, the hydrolysis which cyanates undergo in hot aqueous solution made isolation of pure material difficult, and this method was later replaced by the fusion reaction of urea with an alkali metal carbonate. In this reaction the carbonate and urea are mixed in an approximately 1:2 molar ratio, heated until the evolution of ammonia subsides, and then additional urea is added and the mixture is heated to the fusion point at 550°–600° C. This method requires intimate mixture of the pulverized reactants prior to heating, and grinding of the solidified reaction melt to recover the cyanate product. In addition, the high reaction temperature results in significant losses of urea through sublimation as well as decomposition of the product by conversion of the cyanate to cyanide. The formation of toxic cyanide not only reduces the yield but also severly limits the use of the cyanate.

In an effort to avoid the blending and grinding problems of the fusion process, the reaction has also been conducted in a rotary ball mill. In this process the reactants are rotated and heated at 150°–300° C for lengthy periods. The need to supply heat to a large reactor and to remove gaseous reaction products results in a very elaborate and complicated unit.

A further development in the process of reacting urea and alkali metal carbonate involves preheating a bed of carbonate and then adding urea in gradually deceasing amounts. The reactants are agitated constantly during the course of the reaction, and less than stoichiometric amounts of urea are added to avoid loss by sublimation or the formation of polymeric urea compounds.

All of these methods suffer from a significant limitation, namely the inability to obtain complete reaction of the urea and carbonate to consistently produce cyanate with a purity greater than about 90 percent. Since the reaction requires the contact of a solid (alkali metal carbonate, e.g. sodium carbonate which melts at 851° C) and a liquid (molten urea, melting at 135° C), the rate of reaction and the degree of completion is inherently governed by the ability of the reactants to come in contact. In the current processes the degree of reaction is limited by the porosity of the carbonate particles. The molten urea initially reacts on the surface of the carbonate to form a solid cyanate coating which effectively blocks the subsurface carbonate from contacting urea for further reaction. Urea added at this point cannot react with the "blocked" carbonate and will either sublime from the reactor or decompose to form water insoluble byproducts.

In an attempt to overcome this limitation, many of the known processes specify that the urea and carbonate reactants must be mixed as thoroughly as possible and also must have as small a particle size as possible. However, even if the solids are intimately mixed and crushed as finely as possible, the increase in contact area is limited and the problem of blocked carbonate is merely spread over a larger number of particles, not overcome.

SUMMARY OF THE INVENTION

It has been discovered that the preparation of alkali metal cyanate by the reaction of urea and alkali metal carbonate can be unexpectedly improved by the addition of water to a partially reacted carbonate-cyanate mixture. This activation step exposes the previously blocked carbonate for further reaction. In the process of the invention a mixture of urea and alkali metal carbonate having a molar ratio of 0.2–0.7:1 is prepared and heated to 120°–200° C. Additional urea is then admixed until a molar ratio of 1.5–1.9:1 urea to carbonate is reached. Heating and mixing continues until substantially all of the urea has reacted, resulting in a mixture of 60–85 percent alkali metal cyanate with unreacted carbonate. Water is then added to break up the blocked carbonate particles. After reheating the mixture to at least 120° C and driving off the water, additional urea is added to react with the newly-exposed carbonate and complete the formation of cyanate.

The process of the invention has a number of advantages, including the consistent production of alkali metal cyanate having a purity equal to or greater than 92 percent, minimum loss of urea, and undetectable contamination by cyanide byproducts. Further, the requirements for complicated processing equipment and high reaction temperatures are eliminated, and significant savings in time and fuel are realized. Grinding of the reactants and product is also unnecessary since the cyanate produced is a finely-divided, powdery material.

An additional advantage of the invention lies in the fact that the process is essentially non-dusting in operation. In many of the current methods urea is added to a very hot (350°–400° C) bed of carbonate. The gaseous byproducts of the reaction entrain considerable particulate carbonate, adding to the product loss and creating an environmental and explosive hazard. In the improved process a portion of the urea is present during the heating steps. As this urea melts and is mixed with the carbonate, the fine particles are sufficiently wetted to prevent dust formation during the reaction.

DETAILED DESCRIPTION OF THE INVENTION

In the practice of the process an alkali metal carbonate, such as sodium or potassium carbonate, is initially reacted with a less than stoichiometric amount of urea, i.e. the mixture prior to water addition has a ratio of less than the theoretical two moles of urea per mole of carbonate necessary to produce the cyanate. About 10–30 percent (preferably 20–30%) of the total urea charge, or about 0.4–0.7 mole of urea per mole of carbonate, is mixed with the carbonate. This mixture is heated to 120°–200° C, preferably to the range of 135°–150° C, and additional urea is then introduced. Urea addition is continued at a temperature of 120°–200° C, with mixing, until the molar ratio of urea to carbonate in the mixture reaches the range of 1.5–1.9:1. The preferred molar ratio of urea to carbonate prior to water addition is 1.5–1.7:1. When substantially all of the added urea has reacted, the batch has a composition ranging from 60–85 percent alkali metal cyanate and 40–15 percent unreacted alkali metal carbonate.

After the cyanate-carbonate mixture is prepared, water is added and dispersed into the mixture. The amount of water added may vary with the temperature and other operating conditions, but the addition of 10–30 percent by weight has been found most effective. The temperature of the mixture can be reduced to below 100° C prior to the water addition, or the water addition itself can be regulated so as to naturally lower the temperature. The mixture retains its powdery nature without any caking or formation of a liquid phase.

Upon completion of the water addition the temperature of the mixture is again brought to 120°–200° C, driving off the water. Urea is then added to react with the remaining alkali metal carbonate, usually at a rate which allows the temperature to be maintained in the preferred range of 135°–150° C. The remainder of the total urea charge may be added at this point, or only a portion may be used, followed by a second water addition, reheating and further urea addition. Normally a single water addition followed by the remainder of the urea charge is sufficient to provide a product of better than 92 percent cyanate. However, in some instances it may be desirable to repeat the addition of water followed by reheating and further urea addition in order to maximize the product yield. In this manner a final concentration of alkali metal cyanate product greater than 95 percent may be achieved.

It has been found that the total charge of urea may be in excess of the theoretical without a detrimental effect on the product. However, a final molar ratio in the range of 2.0–2.2:1, and preferably about 2.1:1 urea to carbonate, has been found most satisfactory.

Microscopic examination of a typical intermediate cyanate-carbonate mixture before and after water addition indicates the probable mode of action of the water. Prior to water addition the particles of the mixture retain the overall structure and particle size of the starting carbonate. After water addition and drying the particles of the mixture appear as a very finely-divided crystalline powder, with the average particle size reduced to approximately one-quarter of the starting carbonate particles. It thus appears that the original particulate structure is maintained by a network or coating of cyanate on the surface of the carbonate particles. Dissolution or hydrolysis of the cyanate by the water destroys the coating and the original particulate structure, exposing the blocked carbonate for further reaction.

The invention is further illustrated in the following specific examples.

EXAMPLE 1

The following series of tests was carried out in a static bed, i.e. without continuous mixing of the reactants. Urea and sodium carbonate were reacted in a molar ratio of 1.7:1 to form an intermediate sodium cyanate-sodium carbonate mixture having the composition 75.0% NaCNO and 21.2% $Na_2CO_3$. Various amounts of water were added to samples of this mixture on a weight percent basis, the water was thoroughly mixed with the sample, and all were dried in a forced air oven at 110°–140° C. After cooling, additional urea was mixed into each sample and the components were ground together in a mortar. The samples were then heated to 150°–160° C and held at that temperature overnight (16–18 hours). The sodium cyanate content was determined, and the results are summarized in the following table.

TABLE I

| Sample | %$H_2O$ Added | Product %$Na_2CO_3$ | %NaCNO |
|---|---|---|---|
| 1 | 0 | 9.2 | 85.6 |
| 2 | 10 | 6.6 | 89.4 |
| 3 | 15 | 5.8 | 89.9 |
| 4 | 20 | 5.2 | 90.7 |
| 5 | 25 | 4.7 | 92.6 |
| 6 | 30 | 4.6 | 92.4 |

These tests demonstrated that the addition of water to a blocked carbonate-cyanate mixture over a range of 10–30%, followed by the addition of fresh urea and reheating, significantly improved the product.

EXAMPLE 2

A series of samples was prepared following the procedure set forth in Example 1, with the results shown in Table II. Product from these samples was then treated by a second water addition followed by a fresh charge of urea and reheating. The results of this double treatment are summarized in Table III.

TABLE II

| Sample | Wt.(g.) | %$H_2O$ | Urea Added(g.) | Product %$Na_2CO_3$ | %NaCNO |
|---|---|---|---|---|---|
| 7 | 41 | 0 | 9.4 | 8.7 | 85.0 |
| 8 | 41 | 10 | 9.4 | 5.6 | 90.2 |
| 9 | 41 | 15 | 9.4 | 5.6 | 91.5 |
| 10 | 41 | 20 | 9.4 | 5.4 | 92.4 |

TABLE III

| Sample | Wt.(g.) | %$H_2O$ | Urea Added(g.) | Product %$Na_2CO_3$ | %NaCNO |
|---|---|---|---|---|---|
| 9 | 35 | 15 | 2.7 | 1.9 | 94.7 |
| 10 | 37 | 20 | 3.0 | 1.9 | 95.8 |

These tests demonstrated that a second water treatment and urea addition can further improve the purity of the cyanate product to over 95 percent.

EXAMPLE 3

The process of the invention was carried out on a large scale using a continuously agitated reaction mixture. A commercial double arm jacketed mixer with a circulating oil heating medium was used as the reactor. The cold mixer was charged with 1700 pounds of sodium carbonate and 500 pounds of urea. This mixture was heated to 135°–150° C and an additional 950 pounds of urea was added over a 4 hour period, maintaining the temperature within this range during the addition. Without cooling the mixture, 50 gallons of water was introduced into the reactor with continuous agitation. The mixture was then reheated to 135°–150° C and an additional 600 pounds of urea was added over a 4 hour period. Representative product samples were taken as the final urea addition progressed. Table IV summarizes the results obtained from this procedure compared to the results of a similar procedure without the water addition.

TABLE IV

| Urea Added (lbs) | No Water | | Water Addition | |
| --- | --- | --- | --- | --- |
| | %Na$_2$CO$_3$ | %NaCNO | %Na$_2$CO$_3$ | %NaCNO |
| 1800 | 18.5 | 78.0 | — | — |
| 1900 | 14.2 | 80.7 | 9.4 | 88.3 |
| 2000 | 10.0 | 83.9 | 5.8 | 91.8 |
| 2050 | 9.3 | 83.9 | 4.8 | 90.7 |

While the invention has been described with particular reference to specific embodiments, it is evident that alternatives, modifications, and variations will be apparent to those skilled in the art in light of the foregoing description. Accordingly, it is intended to embrace all such alternatives, modifications, and variations as fall within the spirit and scope of the appended claims.

What is claimed is:

1. A process for the production of alkali metal cyanate which comprises mixing urea and alkali metal carbonate in a molar ratio of 0.2–0.7:1, heating the mixture to 120°–200° C and admixing additional urea until a molar ratio of 1.5–1.9:1 urea to carbonate is reached, adding water to the resulting mixture of alkali metal cyanate and alkali metal carbonate, reheating the mixture to at least 120° C, and adding additional urea.

2. The process of claim 1 wherein a reaction temperature of 135°–150° C is maintained during the initial heating step and the reheating step.

3. The process of claim 1 wherein the amount of water added is equivalent to 10–30 percent by weight of the mixture.

4. The process of claim 1 wherein the mixture prior to water addition contains 60–85 percent alkali metal cyanate.

5. The process of claim 1 wherein the steps of water addition, reheating, and subsequent urea addition are repeated until substantially all of the alkali metal carbonate has reacted.

6. The process of claim 1 wherein the total amounts of urea and alkali metal carbonate added have a molar ratio of 2.0–2.2:1.

7. The process of claim 1 wherein the alkali metal carbonate is sodium carbonate.

8. In the process for the preparation of sodium cyanate by the reaction of urea and sodium carbonate, the improvement which comprises:
   a. mixing urea and sodium carbonate in a molar ratio of 0.4–0.6:1,
   b. heating the mixture to 135°–150° C,
   c. admixing additional urea up to a molar ratio of 1.5–1.7:1 while maintaining the reaction temperature and agitating the mixture until substantially all of the urea has reacted,
   d. adding water equivalent to 10–30 percent by weight of the mixture and agitating,
   e. reheating the mixture to 135°–150° C, and
   f. continuing the addition of urea while maintaining the reaction temperature.

9. The process of claim 8 wherein steps d, e and f are repeated until the molar ratio of urea to sodium carbonate introduced into the reactor reaches 2.0–2.1:1.

* * * * *